US012639449B2

(12) United States Patent
    Tayouri et al.

(10) Patent No.: US 12,639,449 B2
(45) Date of Patent: May 26, 2026

(54) SYSTEM AND METHOD FOR SCANNING CONTAINERS FOR VULNERABILITIES

(71) Applicant: WHITESOURCE LTD., Givatayim (IL)

(72) Inventors: Barel Tayouri, Jerusalem (IL); Amit Chitayate, Tel Aviv (IL); Ariel Shuper, Kfar Haroe (IL)

(73) Assignee: WHITESOURCE LTD., Givatayim (IL)

( * ) Notice: Subject to any disclaimer, the term of this patent is extended or adjusted under 35 U.S.C. 154(b) by 181 days.

(21) Appl. No.: 18/418,711

(22) Filed: Jan. 22, 2024

(65) Prior Publication Data
      US 2025/0238519 A1      Jul. 24, 2025

(51) Int. Cl.
     *G06F 21/57*          (2013.01)
(52) U.S. Cl.
     CPC ...... *G06F 21/577* (2013.01); *G06F 2221/034* (2013.01)
(58) Field of Classification Search
     None
     See application file for complete search history.

(56) References Cited

U.S. PATENT DOCUMENTS 8,881,288 B1 * 11/2014 Levy ..................... G06F 21/577
                                             709/225
8,978,010 B1 * 3/2015 Thumfart .................. G06F 8/36
                                             717/123

10,560,364 B1 * 2/2020 Kondaveeti ............. H04L 67/10
2003/0200350 A1 * 10/2003 Kumar .................... G06F 9/445
                                                       719/315
2016/0277423 A1 * 9/2016 Apostolescu .......... G06N 20/00
2019/0347422 A1 * 11/2019 Abadi ................. G06F 16/9024

(Continued)

OTHER PUBLICATIONS

Utture, A., Liu, S., Kalhauge, C. G., & Palsberg, J. (May 2022). Striking a balance: pruning false-positives from static call graphs. In Proceedings of the 44th International Conference on Software Engineering (pp. 2043-2055).*

(Continued)

*Primary Examiner* — Jeffrey Nickerson
*Assistant Examiner* — Vadim Savenkov
(74) *Attorney, Agent, or Firm* — The Roy Gross Law Firm, LLC; Roy Gross

(57) ABSTRACT

A method, computerized apparatus and computer program product, the method comprising: obtaining a collection of entities including a source code file and a non-source-code file; identifying a bundle within the collection of entities; generating a call and dependency graph of the collection of entities, the graph comprising two or more nodes each associated with an entity, and at least one edge indicating a calling relationship between the nodes, said generating comprising: generating an initial call and dependency graph, indicating reachability of each of the collection of entities starting from an entry point; and pruning the initial call and dependency graph by reducing an edge according to collected heuristics, to obtain a pruned call and dependency graph; obtaining information about vulnerabilities associated with the bundle or any of the collection of entities; and providing an indication of a reachable vulnerability and an unreachable vulnerability in the pruned call and dependency graph.

19 Claims, 9 Drawing Sheets

(56)  References Cited

U.S. PATENT DOCUMENTS

| 2019/0362235 | A1* | 11/2019 | Xu | G06N 3/045 |
|---|---|---|---|---|
| 2020/0004964 | A1* | 1/2020 | Soumenkov | G06F 21/566 |
| 2020/0053116 | A1* | 2/2020 | Soroush | H04L 43/045 |
| 2023/0328094 | A1* | 10/2023 | Brown | H04L 63/1433 |
| | | | | 726/23 |
| 2023/0418597 | A1* | 12/2023 | Iwatsuka | G06F 8/36 |
| 2024/0354406 | A1* | 10/2024 | Belák | G06N 3/08 |
| 2024/0370570 | A1* | 11/2024 | Betthauser | H04L 63/1425 |
| 2025/0173443 | A1* | 5/2025 | Ganz | G06F 21/577 |

OTHER PUBLICATIONS

Le-Cong, T., Kang, H. J., Nguyen, T. G., Haryono, S. A., Lo, D., Le, X. B. D., & Huynh, Q. T. (Nov. 2022). Autopruner: transformer-based call graph pruning. In Proceedings of the 30th ACM joint European SW engineering conference and symposium on the foundations of SW engineering (pp. 520-532).*

Ruaro, N., Zeng, K., Dresel, L., Polino, M., Bao, T., Continella, A., . . . & Vigna, G. (Oct. 2021). Syml: Guiding symbolic execution toward vulnerable states through pattern learning. In Proceedings of the 24th International Symposium on Research in Attacks, Intrusions and Defenses (pp. 456-468).*

Alvaro, P., & Galwani, S. (2017). Research for Practice: Tracing and Debugging Distributed Systems; Programming by Examples: Expert-curated Guides to the Best of CS Research. Queue, 15(1), 91-105.*

Zhu, Hang et al. (2021). Network Planning with Deep Reinforcement Learning. In Proceedings of the 2021 ACM SIGCOMM 2021 Conference (SIGCOMM '21). Association for Computing Machinery, New York, NY, USA, 258-271. https://doi.org/10.1145/3452296.3472902.

* cited by examiner

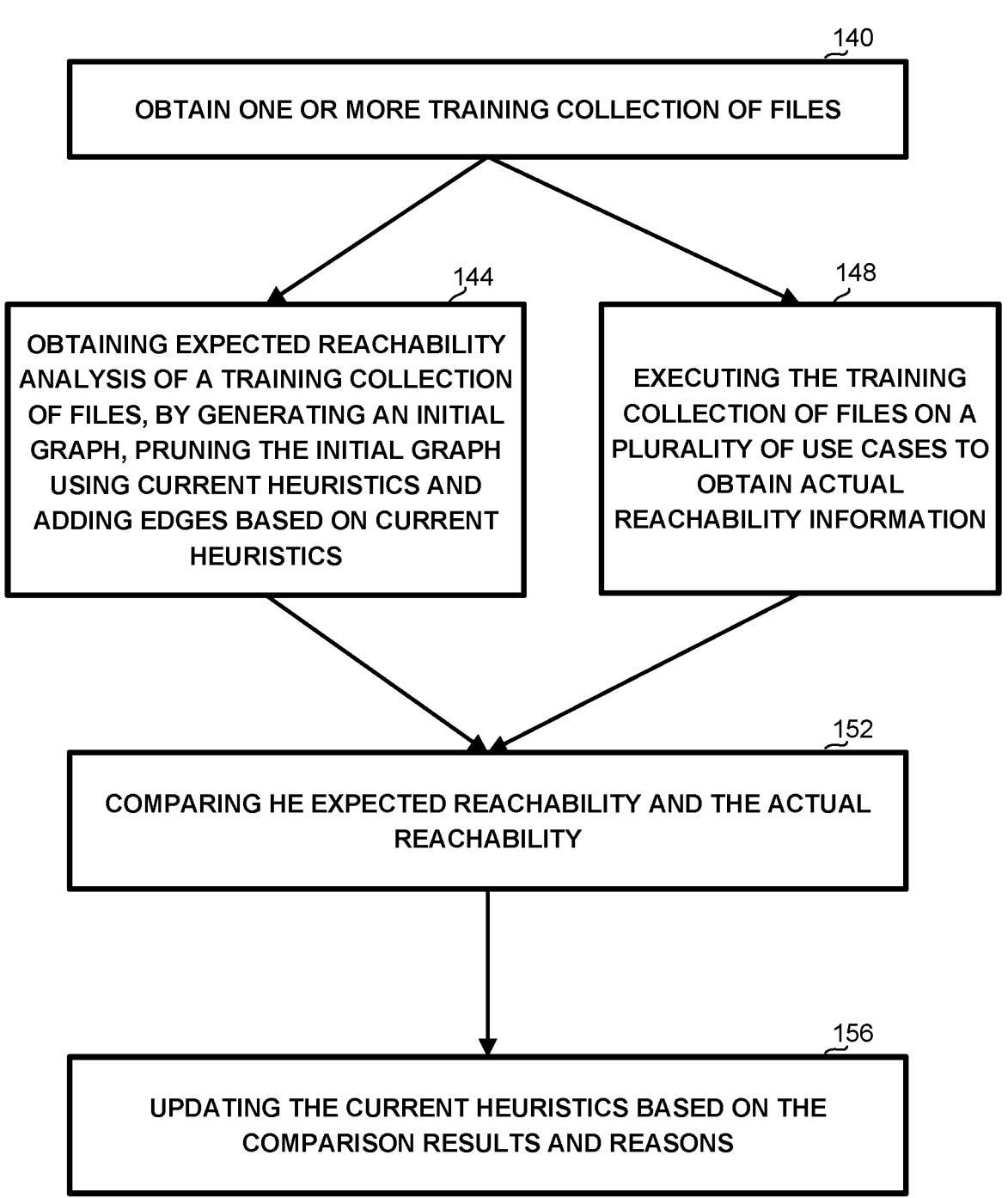

140

OBTAIN ONE OR MORE TRAINING COLLECTION OF FILES

144

OBTAINING EXPECTED REACHABILITY ANALYSIS OF A TRAINING COLLECTION OF FILES, BY GENERATING AN INITIAL GRAPH, PRUNING THE INITIAL GRAPH USING CURRENT HEURISTICS AND ADDING EDGES BASED ON CURRENT HEURISTICS

148

EXECUTING THE TRAINING COLLECTION OF FILES ON A PLURALITY OF USE CASES TO OBTAIN ACTUAL REACHABILITY INFORMATION

152

COMPARING HE EXPECTED REACHABILITY AND THE ACTUAL REACHABILITY

156

UPDATING THE CURRENT HEURISTICS BASED ON THE COMPARISON RESULTS AND REASONS

FIG. 1B

SYSTEM AND METHOD FOR SCANNING CONTAINERS FOR VULNERABILITIES

TECHNICAL FIELD

The present disclosure relates to scanning container images and filesystems in general, and to a system and method for detecting irrelevant vulnerable packages, in particular.

BACKGROUND

Software vulnerabilities are a major cause of a variety of problems, including security problems, privacy violations, financial risks, or any other trouble ranging between mere inconvenience and critical interests including life and death. In particular, security vulnerabilities open a gate to computer hacks, which may cause tremendous damage to the computers and/or to users and clients of the computer systems. By taking advantage of design or implementation flaws, malicious attackers are able to gain access to confidential information available to the target program, take control of the data and use it in a problematic manner.

Thus, a first concern in programming is eliminating vulnerabilities, therefore a significant part of the work of development teams is dedicated to discovering and solving them, whether during the initial programming, or at various debugging and maintenance stages.

However, a lot of the developed code, including code that contains vulnerabilities, is never executed, due to unreachable code, use cases that do not occur in real life, or the like. Correcting vulnerabilities at such code incurs waste of significant time and labor resources on the development teams.

Thus, it is required to identify reachable vulnerabilities in code such that they can be corrected or eliminated, as well as identifying unreachable vulnerabilities, to reduce wasting of resources.

BRIEF SUMMARY

One exemplary embodiment of the disclosed subject matter is a computer-implemented method comprising: obtaining a collection of entities, the collection of entities including at least one source code file and at least one non-source-code file; identifying one or more bundles within the collection of entities; generating a call and dependency graph of the collection of entities, wherein the graph comprises at least two nodes each associated with an entity, and at least one edge indicating a calling relationship between the at least two nodes, said generating comprising: generating an initial call and dependency graph, indicating reachability of each of the collection of entities starting from at least one entry point; pruning the initial call and dependency graph by reducing at least one edge according to collected heuristics, to obtain a pruned call and dependency graph; obtaining information about vulnerabilities associated with the at least one bundle or any of the collection of entities; and providing an indication of at least one reachable vulnerability and at least one unreachable vulnerability in the pruned call and dependency graph. The method can further comprise adding an edge to the pruned call and dependency graph, based upon further training that is utilized in discovering a call by a first entity to a second entity. Within the method, the bundle is optionally at least one item selected from the group consisting of: a container, a virtual machine, and a file system of an operating system. Within the method, generating the initial call and dependency graph and pruning the initial dependency graph is optionally performed using static analysis or reverse engineering without executing code comprised in the collection of files. Within the method, at least one non-source-code file is optionally selected from the group consisting of: a configuration file; a setting file; a file containing information related to runtime of an operating system. Within the method, pruning the initial call and dependency graph is optionally performed to obtain a reduction in a percentage or number of vulnerabilities reachable in the initial call and dependency graph, which are indicated as unreachable in the pruned call and dependency graph. Within the method, the collected heuristics is optionally based on additional data. Within the method, generating and pruning the initial dependency graph optionally uses a "meet in the middle"-like approach. Within the method, the collected heuristics are optionally generated based on a plurality of collections of files and plurality of use cases. The method can further comprise: obtaining the plurality of training collections of files; for at least one training collection of files from the plurality of collections of files: obtaining an estimated reachability of the at least one training collection of files; executing the at least one training collection of files; generating an initial training dependency graph of the collection of files, indicating reachability of each of the collection of files; pruning the initial training dependency graph according to collected heuristics to obtain a pruned dependency graph indicating enhanced reachability of each of the collection of files; and updating the heuristics based on differences between the reachability of at least one part of at least one file from the training collection of files and the enhanced reachability of each of the collection of files. The method can further comprise repeating said obtaining the estimated reachability, said executing, said generating, said pruning and said updating for at least one other training collection of files. Within the method, the least one training collection of files is optionally a package.

Another exemplary embodiment of the disclosed subject matter is a computerized apparatus having a processor, the processor being adapted to perform the steps of: obtaining a collection of entities, the collection of entities including at least one source code file and at least one non-source-code file; identifying at least one bundle within the collection of entities; generating a call and dependency graph of the collection of entities, wherein the graph comprises at least two nodes each associated with an entity, and at least one edge indicating a calling relationship between the at least two nodes, said generating comprising: generating an initial call and dependency graph, indicating reachability of each of the collection of entities starting from at least one entry point; pruning the initial call and dependency graph by reducing at least one edge according to collected heuristics, to obtain a pruned call and dependency graph; obtaining information about vulnerabilities associated with the at least one bundle or any of the collection of entities; and providing an indication of at least one reachable vulnerability and at least one unreachable vulnerability in the pruned call and dependency graph. Within the apparatus, the processor is optionally further configured to add an edge to the pruned call and dependency graph, based upon further training that is utilized in discovering a call by a first entity to a second entity. Within the apparatus, the bundle is optionally at least one item selected from the group consisting of: a container, a virtual machine, and a file system of an operating system. Within the apparatus, generating the initial call and dependency graph and pruning the initial dependency graph is optionally performed using static analysis or reverse engineering without executing code comprised in the collection of files, and using a "meet in the middle"-like approach. Within the apparatus pruning the initial call and dependency graph is optionally performed to obtain a reduction in a percentage or number of vulnerabilities reachable in the initial call and dependency graph, which are indicated as unreachable in the pruned call and dependency graph. Within the apparatus, the collected heuristics are optionally generated based on a plurality of collections of files and plurality of use cases, and wherein the processor or another processor is optionally further configured to: obtaining the plurality of training collections of files; for at least one training collection of files from the plurality of collections of files: obtaining an estimated reachability of the at least one training collection of files; executing the at least one training collection of files; generating an initial training dependency graph of the collection of files, indicating reachability of each of the collection of files; pruning the initial training dependency graph according to collected heuristics to obtain a pruned dependency graph indicating enhanced reachability of each of the collection of files; and updating the heuristics based on differences between the reachability of at least one part of at least one file from the training collection of files and the enhanced reachability of each of the collection of files. Within the apparatus the at least one training collection of files is optionally a package.

Yet another exemplary embodiment of the disclosed subject matter is a computer program product comprising a computer readable storage medium retaining program instructions, which program instructions when read by a processor, cause the processor to perform a method comprising: obtaining a collection of entities, the collection of entities including at least one source code file and at least one non-source-code file; identifying at least one bundle within the collection of entities; generating a call and dependency graph of the collection of entities, wherein the graph comprises at least two nodes each associated with an entity, and at least one edge indicating a calling relationship between the at least two nodes, said generating comprising: generating an initial call and dependency graph, indicating reachability of each of the collection of entities starting from at least one entry point; and pruning the initial call and dependency graph by reducing at least one edge according to collected heuristics, to obtain a pruned call and dependency graph; obtaining information about vulnerabilities associated with the at least one bundle or any of the collection of entities; and providing an indication of at least one reachable vulnerability and at least one unreachable vulnerability in the pruned call and dependency graph.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1B shows a flowchart of steps in a method for improving heuristics for determining reachability, in accordance with some exemplary embodiments of the disclosure;

DETAILED DESCRIPTION

Figure 1A:
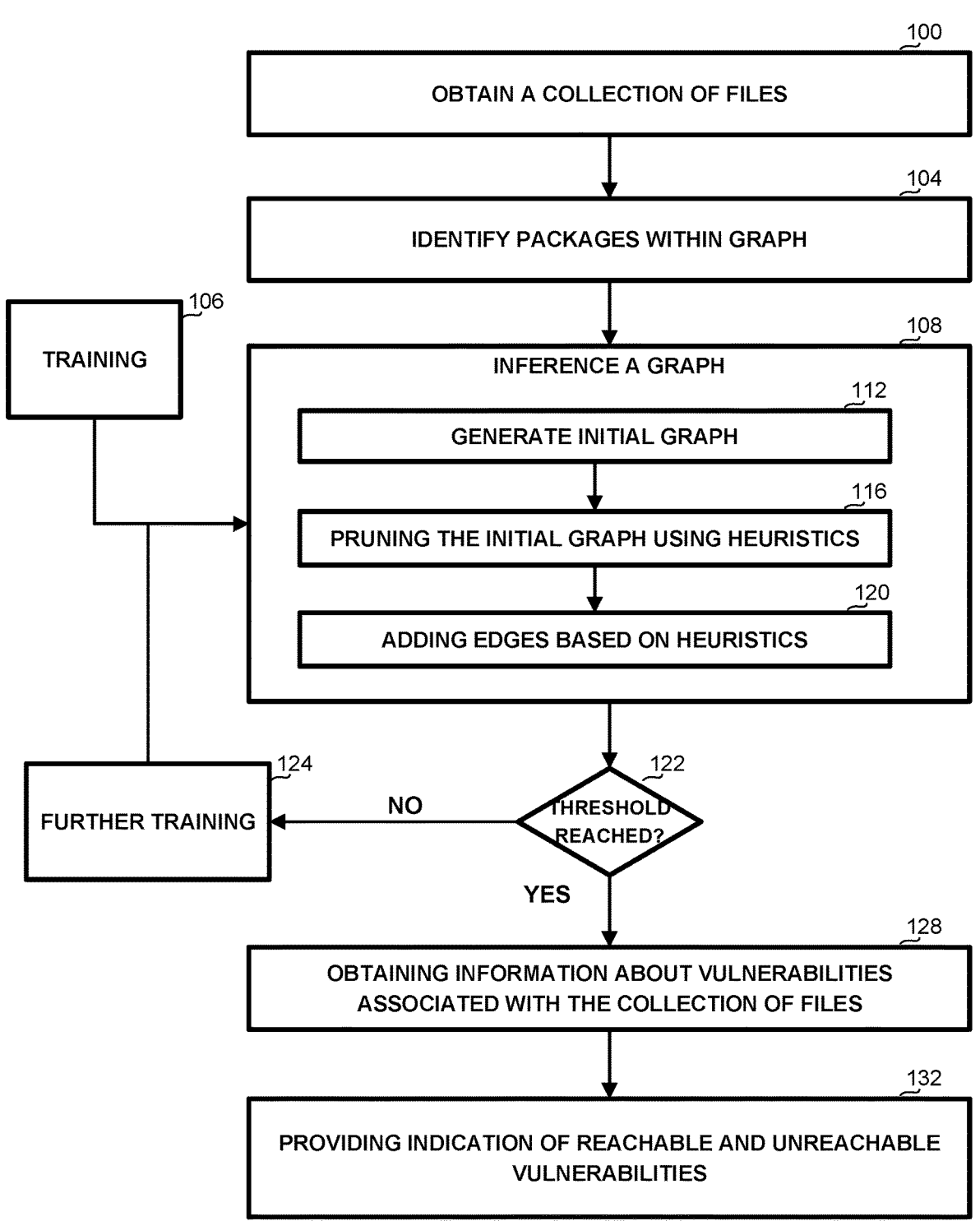
FIG. 1A shows a flowchart of steps in a method for creating a call and dependency graph and detecting reachable vulnerabilities, in accordance with some exemplary embodiments of the disclosure.

The term "package" used in the disclosure is to be widely construed to cover any archive containing computer programs and additional metadata, used for providing functionality, and which may be automatically installed, upgraded, configured, and removed. A package may be of various formats and may bear additional metadata, such as a manifest file or certain directory layouts. A package may contain source code, executable files, text files, or the like.

The term "container" used in the disclosure is to be widely construed to cover any functional and portable computing environment surrounding an application and keeping it independent of other environments running in parallel. The computing environment may be implemented as cloud or non-cloud. A container may thus comprise all the files an application needs to run, as well as the underlying operating system. A container may simulate a software application and can run isolated processes by bundling related configuration files, libraries and dependencies. Thus, a file system, a virtual machine, or the like may also be regarded as a container. A container may comprise one or more packages.

One technical problem dealt with by the disclosed subject matter relates to generating a call and dependency graph of a container or another collection of entities, for example files, such that it is discovered which file or another entity invokes which other file or entity, which file depends on which other file, or the like.

The graph should indicate reachability of various files, packages or other entities contained in the container, such that reachable vulnerabilities are assumed to be included in the graph, and code segments not included in the graph may be assumed to be unreachable. If such code segment contain vulnerabilities, they can be ignored and are not required to be corrected or eliminated, due to the unreachability.

Another technical problem dealt with by the disclosed subject matter relates to generating the graph in a static manner, without executing the container. Generating the graph using static analysis, and optionally reverse engineering for non-code files, is advantageous over dynamic analysis, as dynamic analysis is limited to the use cases and scenarios that actually occurred during one or more executions, such as that other code segments are not activated but may (or may not) have been activated in other scenarios.

The disclosure involving static analysis thus provides a number of additional advantages over current systems. For example, a method associated with the disclosure may be operated on an earlier stage, such as on the development stage, for example before the container has the full functionality, still comprises known bugs, or the like. This may help to identify vulnerabilities and fix them if they are reachable, or ignore unreached ones thus saving time and labor. Second, there is no need to install any other system or component for monitoring the container, which saves unnecessary burden, and eliminates wasted resources and performance decrease.

Yet another technical problem dealt with by the disclosed subject matter relates to reducing the false positive percentage, i.e. vulnerabilities determined to be unreachable. It may be required to obtain at least a predetermined reduction in a number of vulnerabilities comprised in the container but are actually unreachable.

Yet another technical problem dealt with by the disclosed subject matter relates to reducing the false negative percentage, e.g., the number of vulnerabilities absent from the call and dependency graph, but encountered when executing the code and software in the container or filesystem.

One technical solution of the disclosure comprises inferring a call and dependency graph. The graph may comprise at least one entry point from which execution of the container can start. The graph may contain at least two nodes wherein each node is associated with an entity from the collection of entities, and a directed edge from a first entity to a second entity indicating that the first entity calls the second entity in at least one scenario or use case, or that the second entity depends on the first entity. The edges may be uni-directional or bi-directional. It is appreciated that a graph is a data structure which may be implemented in a variety of ways, stored, or the like.

Inferring the graph may include an initial generation of the graph, and one or more pruning stages. Optionally, one or more edges may be added to the graph, whether such edges have never been present, or have been present and removed during pruning the graph.

Generating the initial graph and pruning the graph may be based on static analysis using the static contents of the container, rather than on executing the container. For example, reverse engineering may be applied to non-source-code files.

The initial graph may be generated using any known techniques such as crawling, static analysis, analysis of configuration files, reverse engineering, analysis made by AI and additional techniques such as specific heuristics relevant to containers and operating systems with collections of files, including mapping dependency between files in a container.

The pruning stage may employ techniques such as an adaptation of the "meet in the middle" methodology.

The initial generation and the pruning stage may use heuristics collected during a training stage, which provides information about the interconnections between entities, and thus their reachability.

In some embodiments, the training stage may comprise executing a plurality of containers to obtain an actual call graph for each such container, and in addition applying the available heuristics to the same containers. The differences between the execution-generated call graph and the graph generated upon the existing heuristics, e.g., code that is actually reachable as identified from one or more executions but was indicated as unreachable, or the other way around, may be analyzed and used for improving the heuristics. Specifically, the code that was indicated as unreachable but actually called is a false negative, and in addition to eliminating it, the inference's accuracy may be learned and its faults and how to correct them, wherein the learning may be automatic, manual or a combination thereof.

The conclusions from the differences may be put to use by enhancing the heuristics. In one example, existing connections between certain files, packages, or certain files thereof are used for connecting these entities to other reachable entities, thereby making them reachable, too.

In another example, entities may not be reached even after a large number of executions, for example a number of executions exceeding a threshold, a number of use cases exceeding a threshold, a distribution over time or other parameters of executions exceeding a threshold, or the like. These entities may then be marked as unreachable, even if theoretically they can be reached.

Information about vulnerabilities in the code may then be obtained, for example from a database, manually marked, or the like.

Vulnerabilities in code that were initially unreachable but found to be reachable due to the heuristics, may reduce the false negative occurrences, where reachable code is mistakenly marked as unreachable and thus not handled. It is appreciated that vulnerabilities known or found to exist in such code need to be taken care of and corrected or eliminated.

The reverse case, of vulnerabilities in code that was marked as reachable but was actually unreachable in a significant number of executions may be ignored, thereby reducing the false positive occurrences and saving unneeded development efforts.

One technical effect of the disclosure is the provisioning of a method and apparatus for static reachability analysis of file collections, and in particular containers, comprising code files as well as non-code files. The reachability analysis enables a user to avoid wasting resources on correcting or eliminating unreachable vulnerabilities, and to focus on the ones identified as reachable. The static analysis enables for deploying the solution at development stages, including early ones where not all the code is available, and before it is used by intended customers and causes harm due to surprisingly reached vulnerabilities. This early analysis also makes unnecessary the installation of additional components at the customer's site, thereby saving labor and improving performance.

Another technical effect of the disclosure is the generation of a call and dependency graph relating not only to code files but also to non-code files, such as settings, configuration and other files contained in a container or in any other file system within an operating system. Extracting information from non-code files provides for employing the meet-in-the-middle approach and analyzing the calls and dependencies more efficiently.

Yet another technical effect of the disclosure is the reduction in false negative alerts, which is critical, since it eliminates cases of vulnerabilities that were considered unreachable. The percentage of false negatives may be reduced as the training set is expanded with more containers and more use cases, as more vulnerabilities are found to be reachable.

Yet another technical effect of the disclosure is the reduction in false positive alerts. False positive cases are those where vulnerabilities are actually unreachable, such that by eliminating them significant resources may be saved by the developers not having to correct or eliminate them. In some exemplary experiment, the false positive rate in the NGINX package was reduced by 50 percents.

Referring now to FIG. 1A, showing a flowchart of steps in a method for creating a call and dependency graph and detecting reachable vulnerabilities, in accordance with some exemplary embodiments of the disclosure.

At step 100, a collection of entities may be obtained. The collection of files may be a container, a virtual machine, a file system of an operating system, or the like. The entities may be obtained from a storage device, over a network, from a cloud storage, or the like. The entities may include packages, code files, non-code files, text files, binary files, settings files, entities such as methods, functions, classes, objects which may be contained in one or more files, or the like. At least one non-code file may be a configuration file, a setting file, a file containing information related to runtime of an operating system, or the like.

At step 104, one or more bundles may be identified within the collection of entities. In some exemplary embodiment, at least one bundle may be a package. Identifying the packages may utilize knowledge about known packages, packages available at the environment, knowledge about the structure of packages, heuristics, one or more rule engines, or the like.

At step 108, inference may be applied to generate as accurate as possible call and dependency graph for the collection of entities.

In the disclosure below, the terms entities and nodes are used interchangeably, such that reference to anode refers to the entity it represents, and vice versa, and similarly for edges and calling or dependence relationships.

Inference stage 108 may comprise an initial graph generation step 112. The graph may comprise node for each entity, and an edge between two nodes for each calling relationship or dependence relationship between the nodes. Initial graph generation step 112 may use crawling through the entities, starting at one or more entry points, and continuing therefrom to entities called therefrom or on which they depend (e.g. if node A calls node B, then A depends on B), using code analysis, knowledge about dependencies, heuristics about the containers or entities, or the like. The heuristics may be obtained by training upon a plurality of containers.

Inference stage 108 may comprise a pruning stage 116 for reducing edges from the graph, and thus indicating one or more packages or other entities associated with isolated nodes as unreachable, and their vulnerabilities irrelevant. Pruning stage 116 may be performed using an approach similar to the "meet in the middle" approach, where analysis starts from leaves of the graph and proceeds to nodes that called these entities, then to the entities that called these entities, and so on. Pruning may use heuristics based on a collection of use cases and scenarios in which multiple packages have been executed, and applying conclusions therefrom, such as which entity calls which entity. Some aspects of the call and dependency graph generation may be found in "Network Planning with Deep Reinforcement Learning", by Hang Zhu et al., published in Sigcomm. 2021, incorporated herein by reference in its entirety and for all purposes.

At step 120, one or more edges may be added to the graph based on the edge being discovered in the training, due to a first entity calling a second entity, wherein such edge has been absent. It is appreciated that an edge may be added regardless of whether such edge existed and was deleted on pruning step 116, or was not assumed to exist during the initial graph generation.

It is also appreciated that inference stage 108 or parts thereof may be performed automatically, manually by a user, or in a hybrid manner whether one or more edges are added or deleted by a user, or one or more edges are added or deleted automatically. In some example embodiments, it may be automatically suggested to add or delete an edge subject to approval by the user.

It is also appreciated that the stages contained within step 108 may be divided in other manner. For example, in some techniques edges may be deleted and added intermittently, and not necessarily first removing edges and then adding new ones.

Once inference stage 108 is done, it may be assessed on step 122 whether the results are satisfactory, for example whether a threshold has been reached. The threshold may involve assigning a rank to one or more of the following factors and combining the ranks:

The number or percentage of false positive that have been removed, i.e., the number of edges that have been pruned. The larger the number, the more work has been saved from the developers of the container. Thus, the rank may relate to a number of pruned edges, such that the higher the number, the higher the rank.

The number or percentage of false negative cases: the more edges that are being added after the initial graph is generated, for example using heuristics, the higher is the confidence that the heuristics are not good enough, as more edges are being discovered. Thus, it is desired that the number of vulnerabilities absent from the pruned call and dependency graph, and discovered as a result of further training is reduced. It is appreciated that the rate of edges being added due to training is expected to reduce. Thus, the rank may relate to a number of newly added edges, a number per iteration, or the like, wherein the higher the number, the lower the rank.

The factors above, and possibly additional ones, may be combined in any manner, such as assigning a rank to one or more factors and averaging the ranks, possibly with different weights, selecting the highest rank, or the like.

Additionally, a number of iterations or time may be taken into account. Thus, in some embodiments, the graph inference may be iterated at most a predetermined number of times, may take a maximal execution time, or the like. The rank may be compared to a threshold, and if the threshold is not reached (and the maximal number of iterations has not been reached), then at step 124 further training may be performed. The training may comprise execution of the same packages or further packages, execution of packages at additional use cases or scenarios, execution of packages on different types of input, or the like.

Execution may then return to inference step 108 or any of its substeps, such as pruning the graph step 116 or adding edges step 120.

During or after the iterations of inference step 108, details and statistics about the added and deleted connections may be accumulated, and a trend may be analyzed, for example the decrease in percentage or rate of false positives or false negatives, the trend of the certainty of eliminating false positives, or the like.

Once the threshold is reached, vulnerabilities may be obtained which relate to any one or more of the reachable entities, and in particular packages. The vulnerabilities of the packages determined to be reachable need to be handled and corrected or otherwise eliminated, for example by a programmer of the package, or the calling entity.

At step 132, indications may be provided to a user, for example about the reachable and unreachable vulnerabilities, or the packages in which they are contained.

It is important to make the developers aware of the reachable vulnerabilities, as these must be handled, but also about the unreachable vulnerabilities, since there is no need to handle them, and it is a waste of resources to handle them.

It is appreciated that after sufficient training, a significant part of the false positives, i.e., the vulnerabilities identified as unreachable, have been found, thereby increasing the productivity of the developers. However, even if some are left undetected this implies wasting resources, but does not pose any risk, since at most the vulnerability will never be reached.

On the other hand, it is more important to reduce or eliminate the number of false negative cases, as they pose a risk, since an unexpected vulnerability may be reached in runtime. However, the certainty that there are no unknown vulnerabilities is increased as the number of use cases, scenarios and inputs used when executing the packages without encountering the vulnerabilities, or without getting other indications to their reachability is increased.

Thus, executing a larger number of use cases and scenarios for at least some of the packages may improve the accuracy of the graph, reduce false positives, and reduce false negatives.

Referring now to FIG. 1B, showing a flowchart of steps in a method for improving the heuristics by which the initial call and dependency graph is pruned and enhanced, in accordance with some exemplary embodiments of the disclosure.

At step 140, one or more training collections of files may be obtained, as described on step 100 of FIG. 1.

At step 144, steps 104 and 108 of FIG. 1A may be operated at least on one of the training collections, to identifying and obtaining an expected reachability for at least one collection. The steps may include generating an initial graph, pruning the graph and possibly adding edges to the pruned graph. The steps may be performed using the heuristics available at the time.

At step 148, the at least one of the training collections may be executed a plurality of time, for example by triggering a plurality of inputs, use cases, scenarios, or the like, in order to invoke as many of the contained entities as possible.

An actual reachability of the training collection may then be determined upon the plurality of executions, for example by collecting logs.

At step 152, the expected reachability, based on the current heuristics and the actual reachability based on the executions, may be compared.

For example, the number of nodes indicated by the expected reachability as reachable, but never called during the executions may be compared, which indicates the effort that would be wasted on fixing unreachable vulnerabilities.

In another example, the number of nodes indicated by the expected reachability as unreachable but actually called, may be compared, and the reasons for assessing that they are unreachable may be learned.

At step 156, the current heuristics may be enhanced or updated based on the comparison between the expected and the actual reachabilities, and optionally their reasons. The update may be performed automatically, manually, or a combination thereof.

Figure 2:
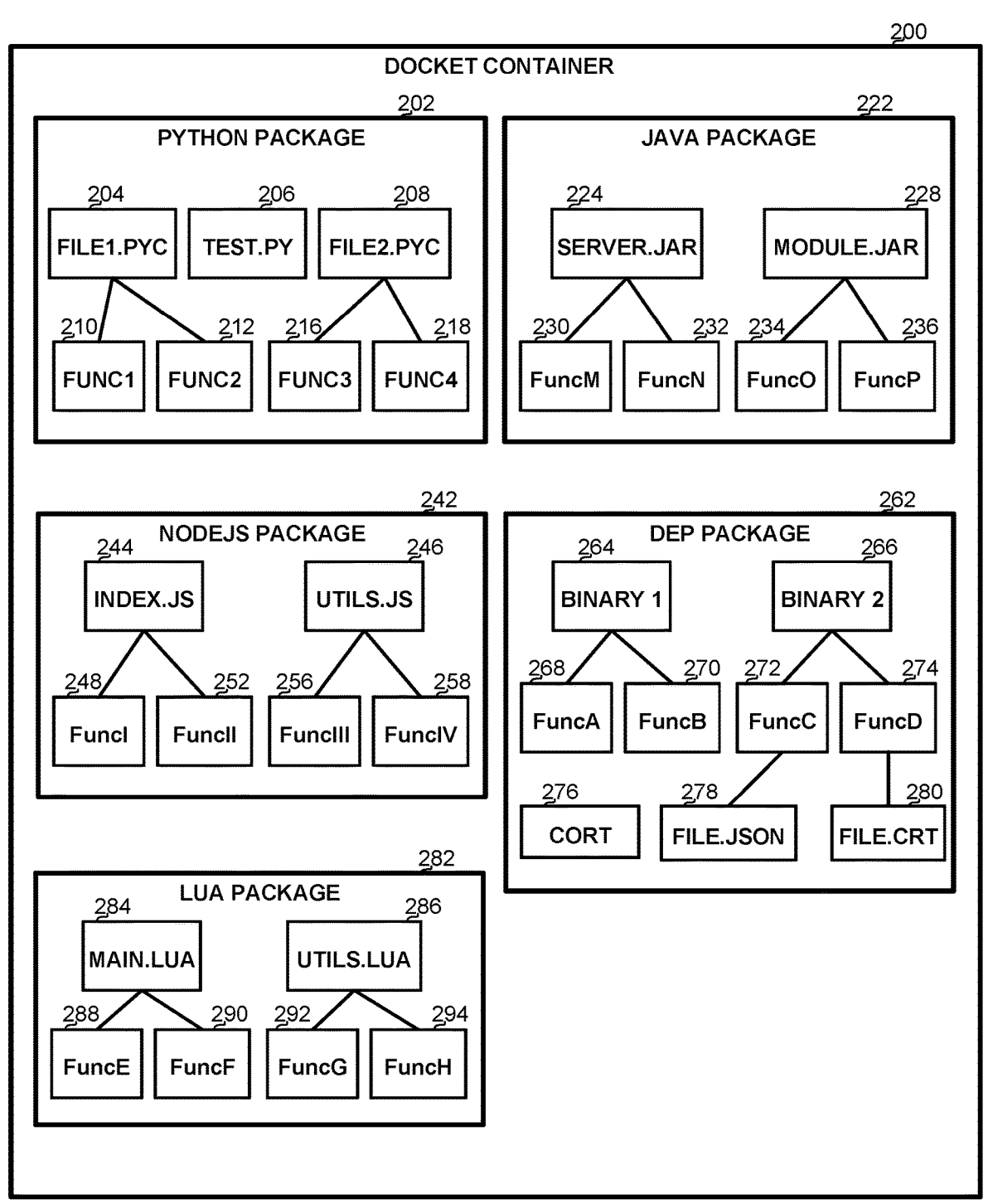
FIG. 2 shows an illustration of a container and the packages identified therein, in accordance with some exemplary embodiments of the disclosure.

Referring now to FIG. 2, showing a container and the packages identified therein, in accordance with some exemplary embodiments of the disclosure. Analyzing docket container 200 determines that docket container 200 comprises a python package 202, comprising a File1.pyc 204 which in turn comprises Func1 210 and Func2 212, File2.pyc 208 which in turn comprises Func3 216 and Func4 218, and Test.py 206.

Docket container 200 further comprises a Java package 222, comprising server.jar 224 comprising FuncM 230 and FuncN 232, and Module.jar 228 comprising FuncO 234 and FuncP 236.

Docket container 200 further comprises a NodeJS package 242, comprising index.js 244 comprising FuncI 248 and FuncII 252, and utils.js 246 comprising FuncIII 256 and FuncIV 258.

Docket container 200 further comprises a Dep package 262, comprising binary1 264 comprising FuncA 268 and FuncB 270, and binary2 266 comprising FunC 272, which in turn comprises file.json 278, and FuncD 274 which in turn comprises file.crt 280. Dep package 262 further comprises cort 276.

Docket container 200 further comprises a Lua package 282, comprising main.lua 284 comprising FuncE 288 and FuncF 290, and utils.lua 286 comprising FuncG 292 and FuncH 294.

It is appreciated that the disclosure is not limited to the number and types of packages or other entities shown in FIG. 2 and described above. Rather, the container can contain any number of packages, of any type, language or environment, and any such package can contain files of any type. It is specifically appreciated that one or more files may be source code files, one or more files may be binary files, yet other one or more files may be text files, or the like. Any package may also contain functions, methods, classes, objects, settings, or the like, contained in one or more files.

Figure 3:
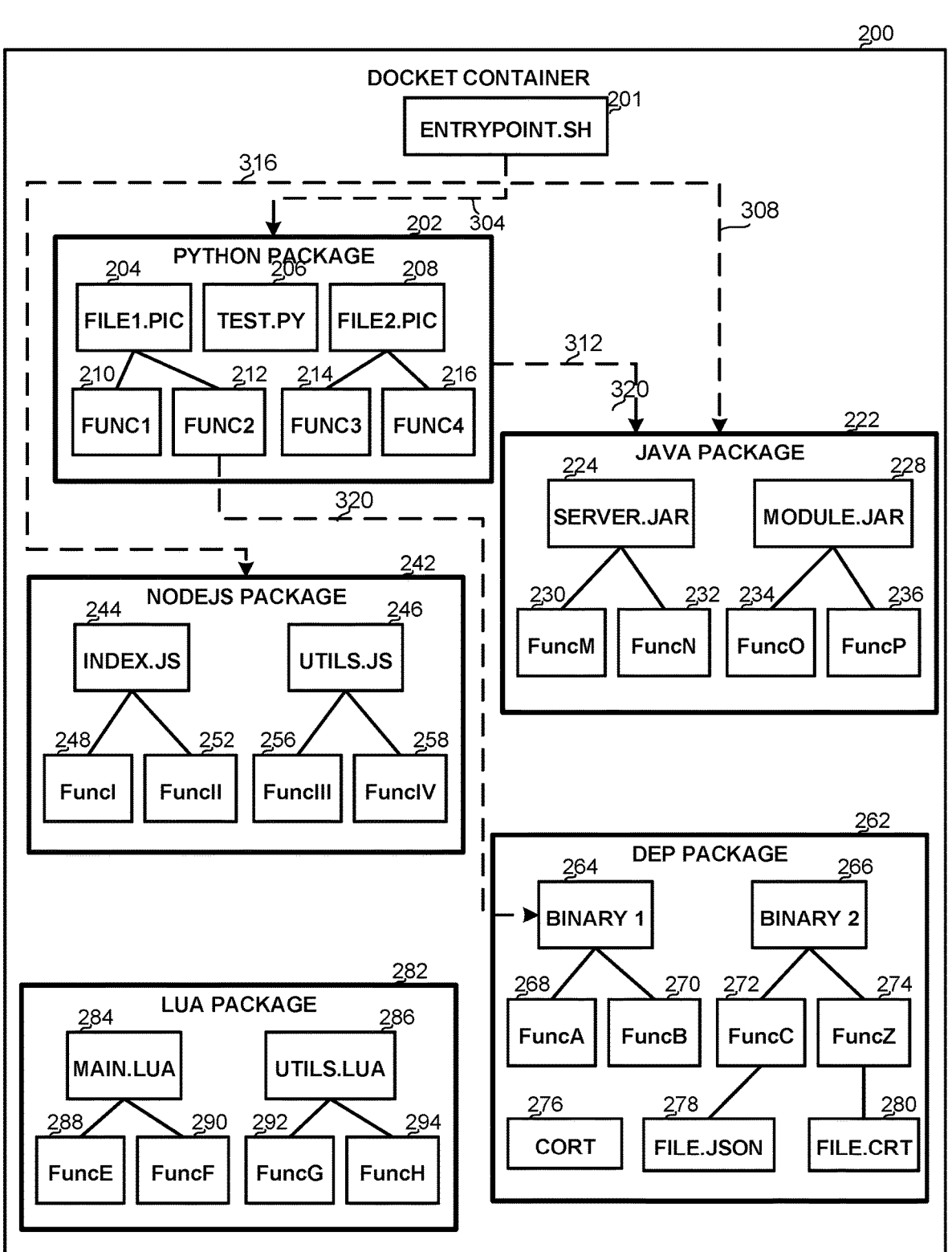
FIG. 3 shows an illustration of an initial call and dependency graph of the packages in the container, in accordance with some embodiments of the disclosure, in accordance with some exemplary embodiments of the disclosure.

Referring now to FIG. 3, showing an initial call and dependency graph of the packages in the container, in accordance with some embodiments of the disclosure.

The graph comprises nodes, wherein each node may represent a package, a file contained within a package, a function, a method, or any other entity, and wherein nodes may be nested, for example a node associated with file may be nested within a node representing a container. The graph may also comprise directed edges, wherein a directed edge from entity A to entity B implies that A may call B or A depends on B.

The initial call and dependency graph may be constructed, for example, starting from one or more entry points, such as the shell entry point entrypoint.sh 301 and crawling through the files, to create a search space, also referred to as a possibilities space. The crawling process may take each file, starting from one or more entry points of the system, and deducing its dependency space. Thus, for each file it finds all the possible files it can call (also referred to as being dependent upon). There is at least one entrypoint, for example in the case of a container it is parsed from the container information. In some cases it may be a bash (also referred to as shell) script.

In some embodiments, creating the initial call and dependency graph may also utilize heuristics for creating a more accurate graph and for speeding up the process.

Thus, FIG. 3 shows that python package 202, Java package 222 and NodeJS package 242 are called directly from entrypint.sh 201 through edges 304, 308 and 316, respectively, and that Java package 222 is also called from python package 202 through edge 312, such that it is called both directly and indirectly from python package 202.

FIG. 3 also shows that Func2 212 of python package 202 calls Binary1 264 of dep package 262 through edge 320.

Thus, the initial call and dependency graph indicates that only lua package 282 is unreachable.

Figure 4:
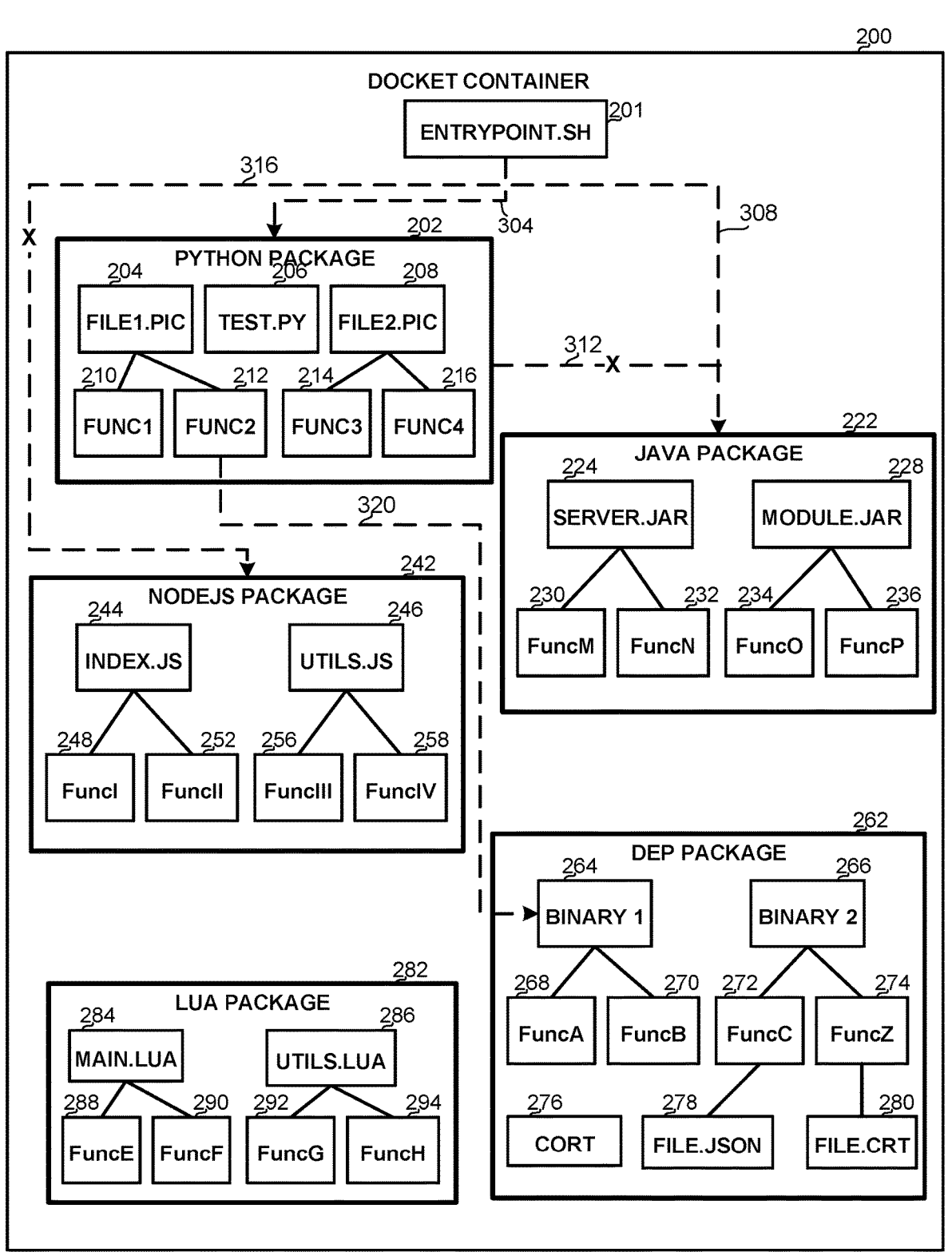
FIG. 4 shows an illustration of the call and dependency graph after being pruned, in accordance with some exemplary embodiments of the disclosure.

Referring now to FIG. 4, showing the call and dependency graph after being pruned, in accordance with some exemplary embodiments of the disclosure.

Pruning may be performed by starting from each entity assumed to be called by another entity, and screening the possibilities. For example, if entity A calls entity B, then starting from entity B, it can be seen that it is unlikely that B will be called by A, therefore the edge from A to B may be deleted. Heuristics based on meta information of the file system and operating system such as package managers, reverse engineering, static analysis, AI or the like may be used for deducing the calling relationships.

The pruning stage may employ knowledge from multiple sources, including execution logs of a plurality of packages, configuration files, script files, heuristics, AI tools, or the like.

Trimming significantly improves the accuracy of the graph, by eliminating false positive edges, thereby reducing the amount of work that would have been put into eliminating vulnerabilities which are unreachable.

In the example of FIG. 4, edges 312 and 316 are eliminated. It is appreciated that packages as well as "lower" level entities such as files may be eliminated if their connections are eliminated, i.e., indicated as unreachable.

Figure 5:
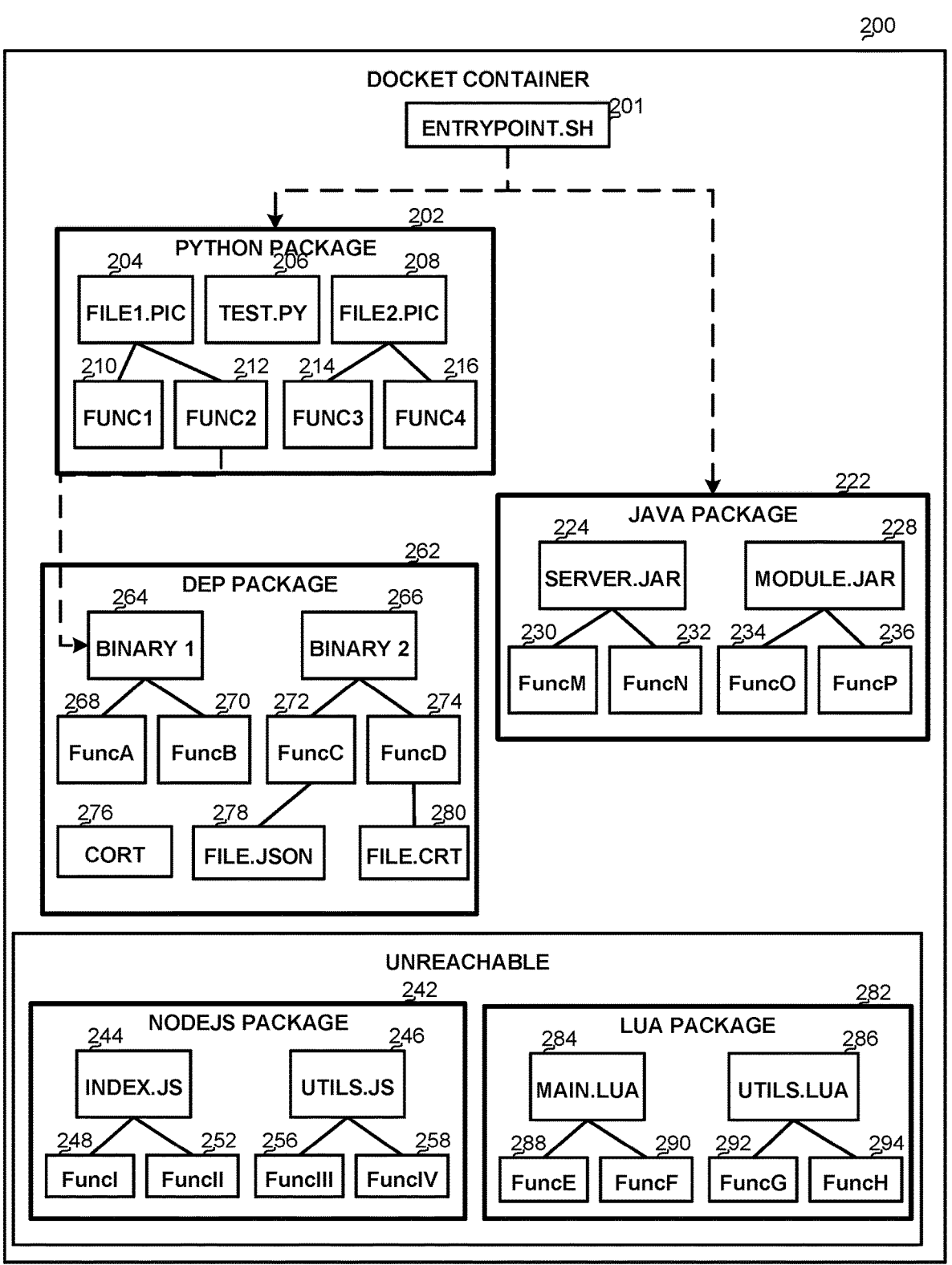
FIG. 5 shows an illustration of the call and dependency graph after eliminating edges, in accordance with some exemplary embodiments of the disclosure.

Referring now to FIG. 5, showing the graph after eliminating edges 312 and 316, in accordance with some exemplary embodiments of the disclosure. It is seen that in addition to lua package 282, NodeJS package 242 is also marked as unreachable. Thus, any effort invested in eliminating vulnerabilities in lua package 282 and NodeJS package 242 may be saved.

Figure 6:
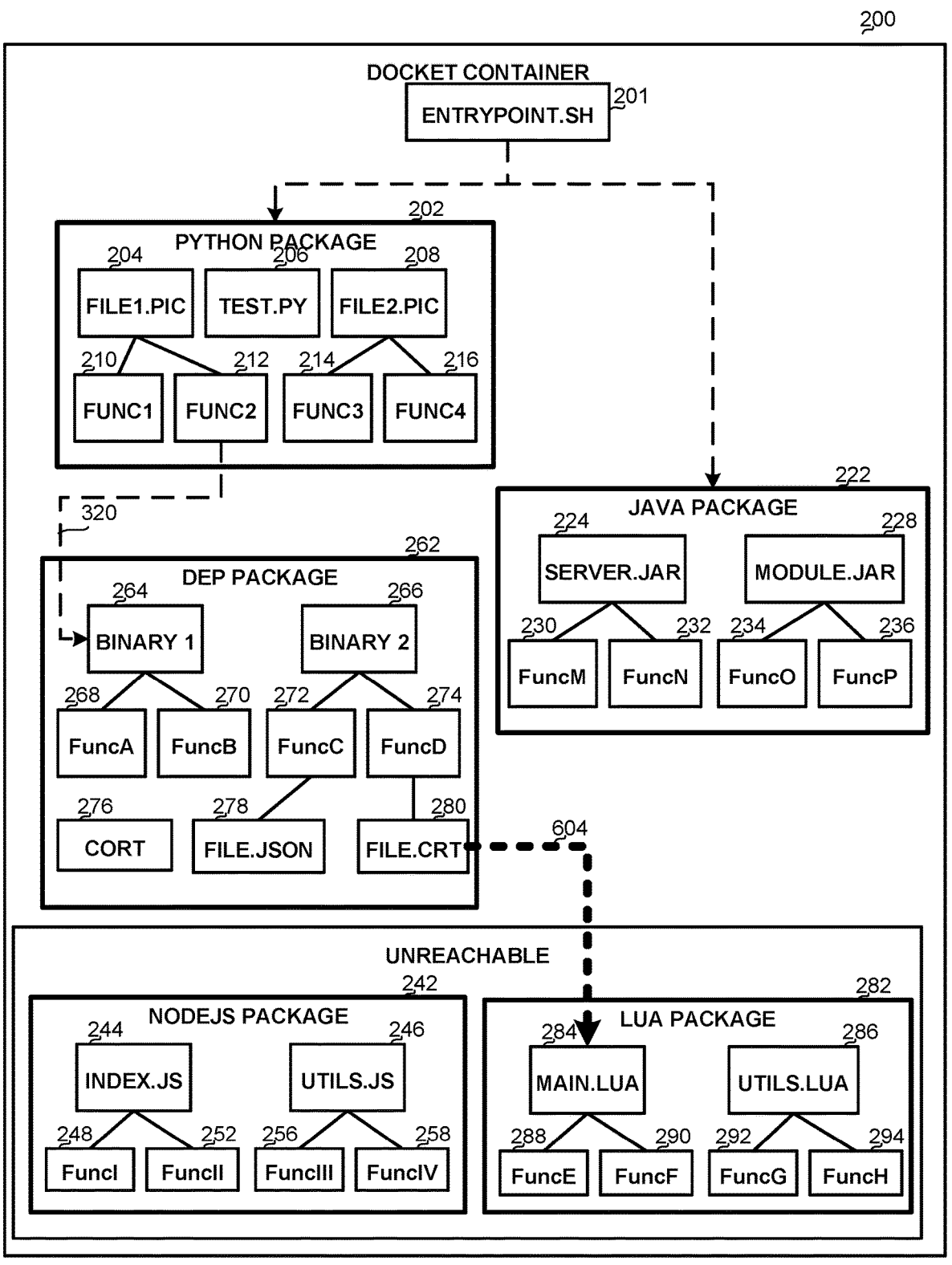
FIG. 6 shows an illustration of the call and dependency graph after additional information has been applied, in accordance with some exemplary embodiments of the disclosure.

Referring now to FIG. 6, showing the call and dependency graph after additional information has been applied, in accordance with some exemplary embodiments of the disclosure. In some embodiments, the information may be obtained by executing a plurality of packages in a plurality of scenarios and use cases.

It is appreciated that any call occurring in any of the executions implies that a corresponding edge needs to be present in the call and dependency graph, as the code is proven to be reachable. However, as the volume of the training executions increases, the certainty level associated with a non-edge, i.e. a pair of nodes associated with a first and second entities in which the first entity never calls the second entity may increase. Once the certainty level has reached a certain threshold, the corresponding edge, if one existed, may be eliminated. If all edges connecting to a certain entity are non-existent, the entity may be recognized as unreachable.

In the example of FIG. 6, edge 604 from file.crt 280 of dep package 262 to main.lua 284 of lua package 282 has been added, based on occurrence of such calling in one or more of the training cases. Thus, edge 604 is added, whether it was present in the initial graph and eliminated during trimming, or was never present.

Figure 7:
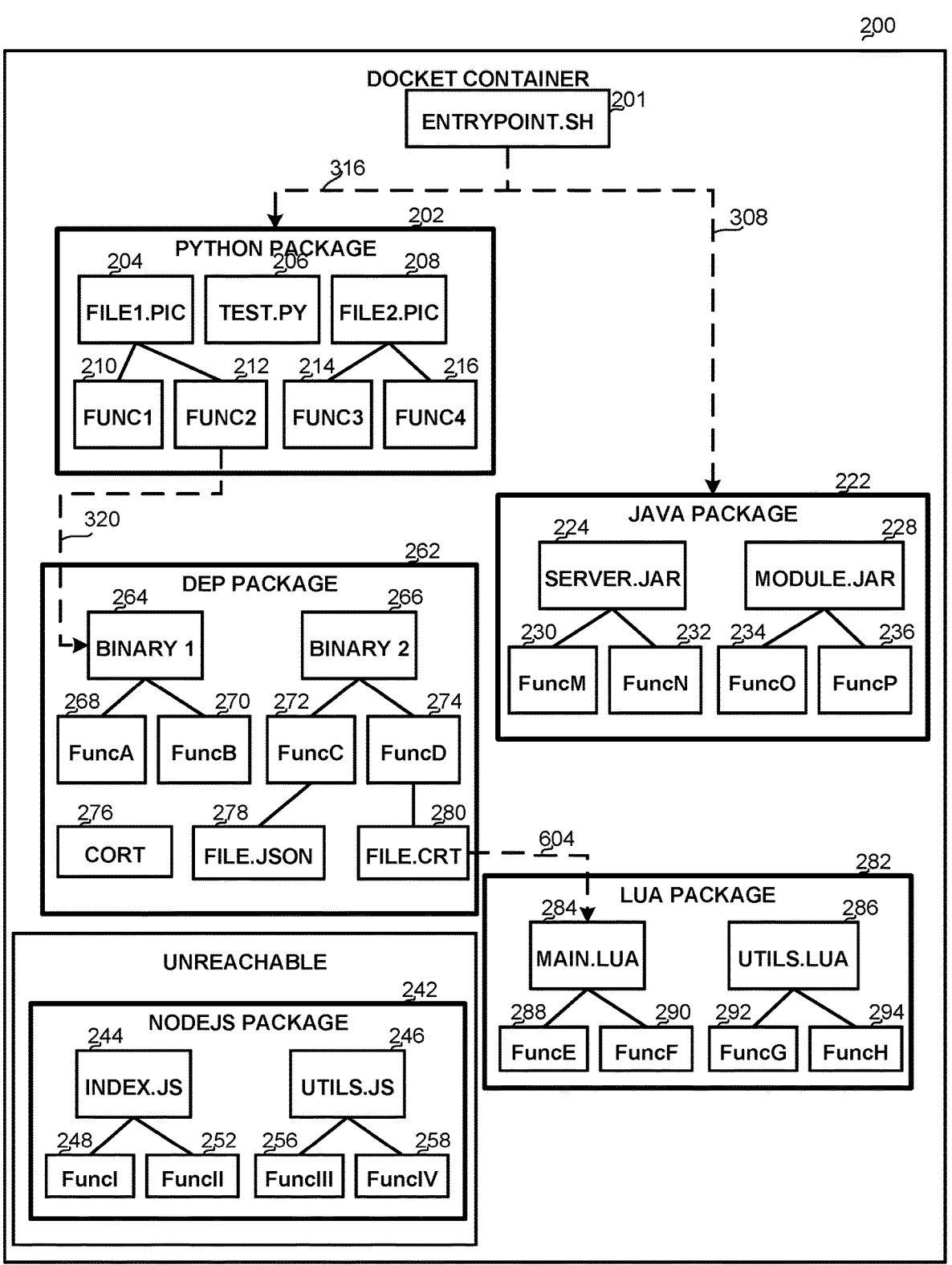
FIG. 7 shows the final call and dependency graph, in accordance with some exemplary embodiments of the disclosure.

FIG. 7 shows the final call and dependency graph, which shows that NodeJS package 242 is unreachable, in accordance with some exemplary embodiments of the disclosure.

Accessing the graph during the pruning stage in the opposite direction (from the leaves to the root) to the initial generation, completes the implementation of an approach that is similar to the "meet in the middle" approach, saves significant processing time as compared to conventional methods. In some experiments, the time of constructing and pruning the graph using this approach was in the order of magnitude of seconds, as compared to days in the conventional approach for generating the graph.

Figure 8:
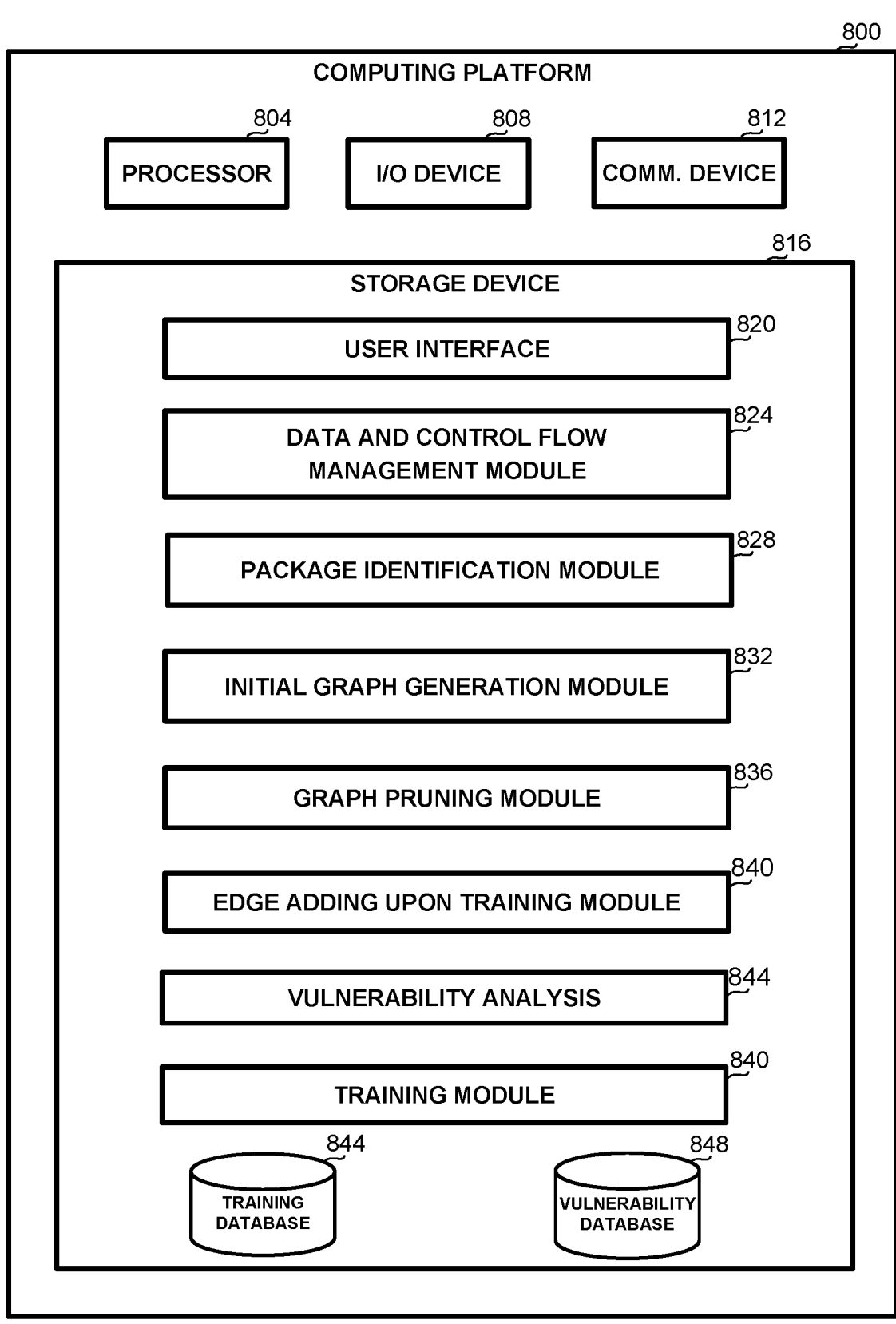
FIG. 8 is a block diagram of a system for creating a call and dependency graph and detecting reachable vulnerabilities, in accordance with some exemplary embodiments of the subject matter.

Referring now to FIG. 8, showing a block diagram of a system for creating a call and dependency graph and detecting reachable vulnerabilities, in accordance with some exemplary embodiments of the disclosure.

The system may comprise one or more computing platforms 800, which may be for example a computing platform used by one or more developer, quality assurance personnel, or the like. The system may be implemented as a stand-alone system, or within a system executing an Integrated Development Environment (IDE), comprising one or more plug-ins, or accessing web services providing services to one or more clients, or the like.

In some exemplary embodiments of the disclosed subject matter, computing platform 800 can comprise processor 804. Processor 804 may be any one or more processors such as a Central Processing Unit (CPU), a microprocessor, an electronic circuit, an Integrated Circuit (IC) or the like. Processor 804 may be utilized to perform computations required by the apparatus or any of its subcomponents.

In some exemplary embodiments of the disclosed subject matter, computing platform 800 can comprise an Input/Output (I/O) device 808 such as a display, a pointing device, a keyboard, a touch screen, or the like. I/O device 808 can be utilized to receive input from a user, such as settings to be employed, and to provide output to a user, such as showing the detected and eliminated vulnerabilities.

In some exemplary embodiments of the disclosed subject matter, computing platform 800 can comprise a communication device 812, for communicating with other computing platforms, for obtaining containers, training results, vulnerabilities knowledge,, or the like.

Computing platform 800 may comprise a storage device 816. Storage device 816 may be a hard disk drive, a Flash disk, a Random Access Memory (RAM), a memory chip, or the like. In some exemplary embodiments, storage device 816 can retain program code operative to cause processor 804 to perform acts associated with any of the subcomponents of computing platform 800.

Storage device 816 can store the modules detailed below. The modules may be arranged as one or more executable files, dynamic libraries, static libraries, methods, functions, services, or the like, programmed in any programming language and under any computing environment.

Storage device 816 may be configured to retain user interface 820 for displaying to a user or receiving from the user various aspects associated with the disclosure, such as displaying vulnerabilities, displaying unreachable packages or other entities, receiving settings from the user, or the like.

Storage device 816 may be configured to retain data and control flow management module 824, for managing the control and data flow within the apparatus, such that modules are invoked at the correct order and with the required information. For example, data and control flow management module 824 can be configured to create the initial graph and then repeatedly to remove or add edges, analyze the reachable vulnerabilities, and provide output to the user.

Storage device 816 may be configured to retain package identification module 828 for identifying the packages retained within the container, and associating each file or other entity with a corresponding container.

Storage device 816 may be configured to retain initial graph generation module 832 for generating an initial call and dependency graph based for example on analyzing binary or source code files, reverse engineering, known heuristics, known usage of files and other settings, or other sources.

Storage device 816 may be configured to retain graph pruning module 836 for analyzing a graph starting from the allegedly reachable leaves and working the way towards the root of the graph, e.g., an entry point, to discover edges that should be removed as the calls associated with the edges are unlikely to occur. Pruning may thereby make one or more nodes indicated as unreachable while they nodes have been assumed to be reachable. Pruning may use knowledge accumulated through execution a plurality of packages over a plurality of use cases, scenarios and inputs, and additional knowledge sources.

Storage device 816 may be configured to retain edge adding upon training module 840 for adding one or more edges as nodes are proven to be reachable upon the training. If a node is reached even in one scenario, it may not be assumed to be unreachable, and thus an edge may be added from the node associated with the calling entity and the specific node.

Storage device 816 may be configured to retain training module 840 for executing a plurality of packages, including one or more of the packages contained in the container. Training may be performed upon scripts or other mechanisms for executing the packages with different use cases, scenarios, inputs or the like. Training may also include maintaining detailed logs of the calling of entities, timing, encountered vulnerabilities and other data. The training results may be stored in training database 844, which may be stored locally or in another storage device operatively connected to computing platform 800.

Storage device 816 may be configured to retain vulnerability database 848, comprising information about known vulnerabilities in packages. Vulnerability database 848 may be searchable by package, by an entity contained in a package, by vulnerability, vulnerability type, source of knowledge about vulnerability, or the like.

In some embodiments, vulnerability database 848 may be stored in a different, local or remote storage device, accessible directly or via an Application Program Interface (API).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, NodeJs, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
obtaining a collection of entities, the collection of entities including at least one source code file and at least one non-source-code file;
identifying at least one bundle within the collection of entities;
generating a call and dependency graph of the collection of entities, wherein the graph comprises at least two nodes each associated with an entity, and at least one edge indicating a calling relationship between the at least two nodes, said generating comprising:
generating an initial call and dependency graph, indicating reachability of each of the collection of entities starting from at least one entry point;
pruning the initial call and dependency graph by reducing at least one edge according to collected heuristics, to obtain a pruned call and dependency graph, wherein generating the collected heuristics comprises:
obtaining a plurality of training collections of files;
for at least one training collection of files from the plurality of collections of files:
obtaining an estimated reachability of the at least one training collection of files;
executing the at least one training collection of files;
generating an initial training dependency graph of the collection of files, indicating reachability of each of the collection of files;
pruning the initial training dependency graph according to collected heuristics to obtain a pruned dependency graph indicating enhanced reachability of each of the collection of files; and updating the collected heuristics based on differences between the reachability of at least one part of at least one file from the training collection of files and the enhanced reachability of each of the collection of files;
adding to the pruned call and dependency graph an edge that was present in the initial call and dependency graph and eliminated during said pruning;
obtaining information about vulnerabilities associated with the at least one bundle or any of the collection of entities; and
providing an indication of at least one vulnerability reachable by the pruned call and dependency graph, and at least one vulnerability unreachable by the pruned call and dependency graph.

2. The method of claim 1, wherein adding the edge to the pruned call and dependency graph is subject to further training that is utilized in discovering a call by a first entity to a second entity.

3. The method of claim 1, wherein the bundle is at least one item selected from the group consisting of: a container, a virtual machine, and a file system of an operating system.

4. The method of claim 1, wherein generating the initial call and dependency graph and pruning the initial dependency graph is performed using static analysis or reverse engineering without executing code comprised in the collection of files.

5. The method of claim 1, wherein the non-source-code file is selected from the group consisting of: a configuration file; a setting file; a file containing information related to runtime of an operating system.

6. The method of claim 1, wherein pruning the initial call and dependency graph comprises removing from the initial call and dependency graph vulnerabilities indicated as reachable.

7. The method of claim 1, wherein the collected heuristics is based on additional data.

8. The method of claim 1, wherein generating and pruning the initial dependency graph uses an adaptation of "meet in the middle" approach.

9. The method of claim 1, wherein the collected heuristics are generated based also on a plurality of use cases.

10. The method of claim 1, further comprising repeating said obtaining the estimated reachability, said executing, said generating, said pruning and said updating for at least one other training collection of files.

11. The method of claim 1, wherein the least one training collection of files is a package.

12. A computerized apparatus having a processor, the processor being configured to perform the steps of:
obtaining a collection of entities, the collection of entities including at least one source code file and at least one non-source-code file;
identifying at least one bundle within the collection of entities;
generating a call and dependency graph of the collection of entities, wherein the graph comprises at least two nodes each associated with an entity, and at least one edge indicating a calling relationship between the at least two nodes, said generating comprising:
generating an initial call and dependency graph, indicating reachability of each of the collection of entities starting from at least one entry point;
pruning the initial call and dependency graph by reducing at least one edge according to collected heuristics, to obtain a pruned call and dependency graph, wherein generating the collected heuristics comprises:

obtaining a plurality of training collections of files;

for at least one training collection of files from the plurality of collections of files:

obtaining an estimated reachability of the at least one training collection of files;

executing the at least one training collection of files;

generating an initial training dependency graph of the collection of files, indicating reachability of each of the collection of files;

pruning the initial training dependency graph according to collected heuristics to obtain a pruned dependency graph indicating enhanced reachability of each of the collection of files; and updating the collected heuristics based on differences between the reachability of at least one part of at least one file from the training collection of files and the enhanced reachability of each of the collection of files;

adding to the pruned call and dependency graph an edge that was present in the initial call and dependency graph and eliminated during said pruning;

obtaining information about vulnerabilities associated with the at least one bundle or any of the collection of entities; and providing an indication of at least one vulnerability reachable by the pruned call and dependency graph, and at least one vulnerability unreachable by the pruned call and dependency graph.

13. The apparatus of claim 12, wherein adding the edge to the pruned call and dependency graph, is subject to further training that is utilized in discovering a call by a first entity to a second entity.

14. The apparatus of claim 12, wherein the bundle is at least one item selected from the group consisting of: a container, a virtual machine, and a file system of an operating system.

15. The apparatus of claim 12, wherein generating the initial call and dependency graph and pruning the initial dependency graph is performed using static analysis or reverse engineering without executing code comprised in the collection of files, and using an adaptation of "meet in the middle" approach.

16. The apparatus of claim 12, wherein pruning the initial call and dependency graph comprises removing vulnerabilities indicated as reachable from the initial call and dependency graph.

17. The apparatus of claim 12, wherein the collected heuristics are generated based also on a plurality of use cases.

18. The apparatus of claim 12, wherein the at least one training collection of files is a package.

19. A computer program product comprising a non-transitory computer readable medium retaining program instructions, which instructions when read by a processor, cause the processor to perform:

obtaining a collection of entities, the collection of entities including at least one source code file and at least one non-source-code file;

identifying at least one bundle within the collection of entities;

generating a call and dependency graph of the collection of entities, wherein the graph comprises at least two nodes each associated with an entity, and at least one edge indicating a calling relationship between the at least two nodes, said generating comprising:

generating an initial call and dependency graph, indicating reachability of each of the collection of entities starting from at least one entry point; and pruning the initial call and dependency graph by reducing at least one edge according to collected heuristics, to obtain a pruned call and dependency graph, wherein generating the collected heuristics comprises:

obtaining a plurality of training collections of files;

for at least one training collection of files from the plurality of collections of files:

obtaining an estimated reachability of the at least one training collection of files;

executing the at least one training collection of files;

generating an initial training dependency graph of the collection of files, indicating reachability of each of the collection of files;

pruning the initial training dependency graph according to collected heuristics to obtain a pruned dependency graph indicating enhanced reachability of each of the collection of files; and updating the collected heuristics based on differences between the reachability of at least one part of at least one file from the training collection of files and the enhanced reachability of each of the collection of files;

adding to the pruned call and dependency graph an edge that was present in the initial call and dependency graph and eliminated during said pruning;

obtaining information about vulnerabilities associated with the at least one bundle or any of the collection of entities; and providing an indication of at least one vulnerability reachable by the pruned call and dependency graph, and at least one vulnerability unreachable by the pruned call and dependency graph.

* * * * *